United States Patent
Okada et al.

(10) Patent No.: US 8,591,077 B2
(45) Date of Patent: Nov. 26, 2013

(54) LENS AND LIGHTING FIXTURE UTILIZING THE SAME

(75) Inventors: Hidetaka Okada, Tokyo (JP); Takuya Matsumaru, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 409 days.

(21) Appl. No.: 12/951,395

(22) Filed: Nov. 22, 2010

(65) Prior Publication Data
US 2011/0122615 A1   May 26, 2011

(30) Foreign Application Priority Data
Nov. 20, 2009   (JP) ................................ 2009-265117

(51) Int. Cl.
F21V 5/00   (2006.01)
(52) U.S. Cl.
USPC ........... 362/327; 362/235; 362/236; 362/244; 362/245
(58) Field of Classification Search
USPC .................. 362/235–236, 244–245, 326–327
See application file for complete search history.

(56) References Cited

U.S. PATENT DOCUMENTS 5,319,496 A * 6/1994 Jewell et al. .................. 359/741

FOREIGN PATENT DOCUMENTS

JP   2002-157904 A   5/2002

* cited by examiner

*Primary Examiner* — Sean Gramling
(74) *Attorney, Agent, or Firm* — Kenealy Vaidya LLP

(57) ABSTRACT

A lens and a lighting fixture utilizing the same provides a plurality of LED light sources as a single light source with a simple configuration. The lens is used with a plurality of light sources in combination and can have a single focus. The lens can include a plurality of light incident portions each disposed so as to face each of the plurality of light sources, the plurality of light incident portions collimating light beams emitted from the plurality of light sources in parallel with a predetermined optical axis while guiding the light beams inside the lens. A light exiting portion can include a refracting surface disposed on optical paths of the collimated light beams guided from the plurality of the light incident portions into the inside of the lens, with the light exiting portions causing the collimated light beams to exit and be converged on the single focus. A lighting fixture can utilize the lens described herein.

15 Claims, 7 Drawing Sheets

LENS AND LIGHTING FIXTURE UTILIZING THE SAME

This application claims the priority benefit under 35 U.S.C. §119 of Japanese Patent Application No. 2009-265117 filed on Nov. 20, 2009, which is hereby incorporated in its entirety by reference.

TECHNICAL FIELD

The presently disclosed subject matter relates to a lens and a lighting fixture utilizing the same, and in particular, to a lens and a lighting fixture utilizing the same that can provide a single light source even with a plurality of LED light sources.

BACKGROUND ART

Conventional LED light source apparatuses have been proposed, that can utilize a plurality of LED light sources and which can be handled as a single light source (for example, Japanese Patent Application Laid-Open No. 2002-157904).

FIG. 1 is a cross sectional view of such an LED light source apparatus as described in Japanese Patent Application Laid-Open No. 2002-157904.

In FIG. 1, the light source apparatus can be applied to a vehicle headlamp 200 and can have a plurality of light-converging cylindrical hoods 210 with an inner reflective surface 211 and a plurality of LED light sources 220 that are disposed so as to correspond to the respective light-converging hoods 210. The LED light sources 220 can be attached to the respective ends of the light-converging hoods 210 so that their optical axes AX1 cross the axis AX2 of the light-converging hood 210 at least one point P. When energized, the LED light sources 220 can emit light which can be reflected by the inner reflective surface 211 of the light-converging hoods 210 so as to be projected from the other end 212 of the light-converging hoods 210. The light-converging hood 210 should be adjusted by the opening angle α as shown in its cross section including the axis X of one light-converging hood 210, so that a pseudo light source P can be formed at the other end 212.

Since the LED light source apparatus 200 can operate as a pseudo light source P by through a plurality of light-converging hoods 210, if a certain amount of light intensity is required, the number of LED light sources must increase together with the increased number of the light-converging hoods 210. In this case, it is difficult to aim the optical axes of large number of LED light sources so as to form a pseudo light source P. A further problem is that the configuration of these light-converging hoods may be complicated.

SUMMARY

The presently disclosed subject matter was devised in view of these and other problems and features and associated with the conventional art. An aspect of the presently disclosed subject matter can provide a lens and a lighting fixture utilizing the same that can form a plurality of LED light sources as a single light source.

According to another aspect of the presently disclosed subject matter, a lens which is capable of being used with a plurality of light sources in combination and which can have a single focus can include: a plurality of light incident portions each disposed so as to face each of the plurality of light sources for collimating light beams emitted from the plurality of light sources in parallel with a predetermined optical axis while guiding the light beams inside the lens; and a light exiting portion including a refracting surface disposed on optical paths of the collimated light beams guided from the plurality of the light incident portions into the inside of the lens, for causing the collimated light beams to exit and be converged on the single focus.

According to the presently disclosed subject matter, the light beams emitted from the plurality of light sources can enter the inside of the lens while they are collimated in parallel with a predetermined optical axis (for example, an optical axis of the lens) by the action of the plurality of light incident portions disposed to face the plurality of light sources. Then, the light beams can exit from the refracting surface of the light exiting portion to be converged on the single focus. Since the lens does not utilize any type of converging hood of was used in the conventional art, even if the number of light sources increases, the configuration is not complicated. Accordingly, by utilizing such a lens, a user can utilize a plurality of light sources as a single light source with a simpler configuration than a conventional light source apparatus utilizing a plurality of light-converging hoods. Namely, the lens made in accordance with the principles of the presently disclosed subject matter can gather the light beams (output) emitted from the plurality of light sources, so that a lighting fixture utilizing the lens can serve as a brighter light source.

In the lens configured as described above, the light exiting portion can include a center lens portion and a surrounding lens portion arranged to surround the center lens portion. The center lens portion can include a center light exiting surface disposed on at least part of the optical paths of the collimated light beams so that the collimated light beams can exit through the center light exiting surface and be converged on the single focus. The surrounding lens portion can include a surrounding light exiting surface arranged to surround the center light exiting surface and a reflecting surface disposed on at least part of the optical paths of the collimated light beams. The reflecting surface can reflect the collimated light beams reaching there so as to cause the reflected light beams to exit through the surrounding light exiting surface and converge at the single focus.

In the lens configured as described above, the light beams emitted from the plurality of light sources can enter the corresponding light incident portions disposed to face the plurality of the light sources so as to be collimated in parallel with the predetermined optical axis by the action of the light incident portions. The collimated light beams entering the inside of the lens and directed to the center lens portion can exit through the center light exiting surface so as to be converged at the single focus. On the other hand, the collimated light beams entering the inside of the lens and directed to the surrounding lens portion can be reflected by the surrounding reflecting surface and exit through the surrounding light exiting surface so as to be converged on a single focus. Accordingly, by utilizing such a lens a user can utilize a plurality of light sources as a single light source with a simpler configuration than a conventional light source apparatus utilizing a plurality of light-converging hoods. Namely, the lens made in accordance with the principles of the presently disclosed subject matter can gather the light beams (output) emitted from the plurality of light sources, so that a lighting fixture utilizing the lens can serve as a brighter light source.

In the lens configured as described above, the light incident portions each can be formed of a convex lens surface being convex toward the light source side and configured to collimate the incident light beams with respect to the lens optical axis.

Alternatively, the light incident portions each can include a center light incident surface arranged on the respective optical axes, a cylindrical surrounding light incident surface disposed to surround the center light incident surface, and a reflecting surface disposed on the optical paths of the incident light beams from the surrounding light incident surface.

In this case, the center light incident surface of the light incident portion may be formed of a convex lens surface being convex toward the light source side and configured to collimate the incident light beams with respect to the lens optical axis, and the reflecting surface may be formed of a revolved parabolic surface to collimate the light beams entering through the surrounding light incident surface.

By this configuration, the light gathering performance at the light incident side can be improved, thereby improving the light utilizing efficiency. Accordingly, the same light intensity can be achieved by reduced number of light sources according to the improved light utilizing efficiency, thereby reducing costs. By reducing the number of the used light sources, the entire size can be reduced, and accordingly, the lighting fixture utilizing the lens can be miniaturized.

In the lens configured as described above, the center light exiting surface may be formed of a convex lens surface being convex toward the illumination direction and having a focus coinciding with the lens focus with the lens optical axis as a rotation axis. Furthermore, the reflecting surface of the surrounding lens portion may be formed of a revolved parabolic surface with the lens optical axis as a rotation axis and having a focus coinciding with the lens focus.

According to still another aspect of the presently disclosed subject matter, a lighting fixture can include a plurality of light sources, and the lens with one of the above-mentioned configurations, wherein the plurality of light sources can face the respective light incident portions.

In the lighting fixture configured as described above, the plurality of light sources may be formed of LED light sources.

In another exemplary embodiment of the lighting fixture configured as described above, the lighting fixture can further include a second lens disposed in front of the lens and having a focus at or near the single focus of the lens.

In still another exemplary embodiment of the lighting fixture configured as described above, the lighting fixture can further include a reflector disposed in front of the lens and having a focus at or near the single focus of the lens.

In the conventional LED light source apparatus 200 as shown in FIG. 1, a plurality of light-converging hoods 210 can be utilized to form a pseudo light source P. In this case, the light-converging hood 210 must be adjusted by the opening angle α as shown in its cross section including the axis X of one light-converging hood 210, so that the light can project in the optical axis AX2 direction to serve as a pseudo light source P derived from the plurality of LED light sources 220. In this case, the inner surface of the hoods 210 must be subjected to surface treatment such as aluminum deposition or the like to form a uniform reflecting surface, thereby increasing the manufacturing cost in terms of yield or the like. Accordingly, it is difficult to obtain a light source utilizing a plurality of LED light sources just like an incandescent bulb or the like.

However, the lens and the lighting fixture utilizing the lens according to the presently disclosed subject matter can project light by the action of the center light exiting surface and the surrounding light exiting surface in the optical axis direction of the lens as a whole. This means the light beams from the plurality of light sources can be utilized as a single light source just like an incandescent bulb or the like (light source that can emit light omnidirectionally).

Accordingly, the presently disclosed subject matter can provide a lens and a lighting fixture utilizing the lens that can be configured simpler than the conventional light source apparatus while utilizing a plurality of LED light sources as a single light source.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to lenses and lighting fixtures utilizing a lens and a plurality of LED light sources in combination with reference to the accompanying drawings in accordance with exemplary embodiments.

The lens made in accordance with the principles of the presently disclosed subject matter can be utilized in the field of vehicle headlamps, general-purpose lighting fixtures, game machines, and the like. In these cases, the lens can be utilized singly or in combination with a plurality of light sources including LED light sources, point light sources, and the like.

Figure 2:
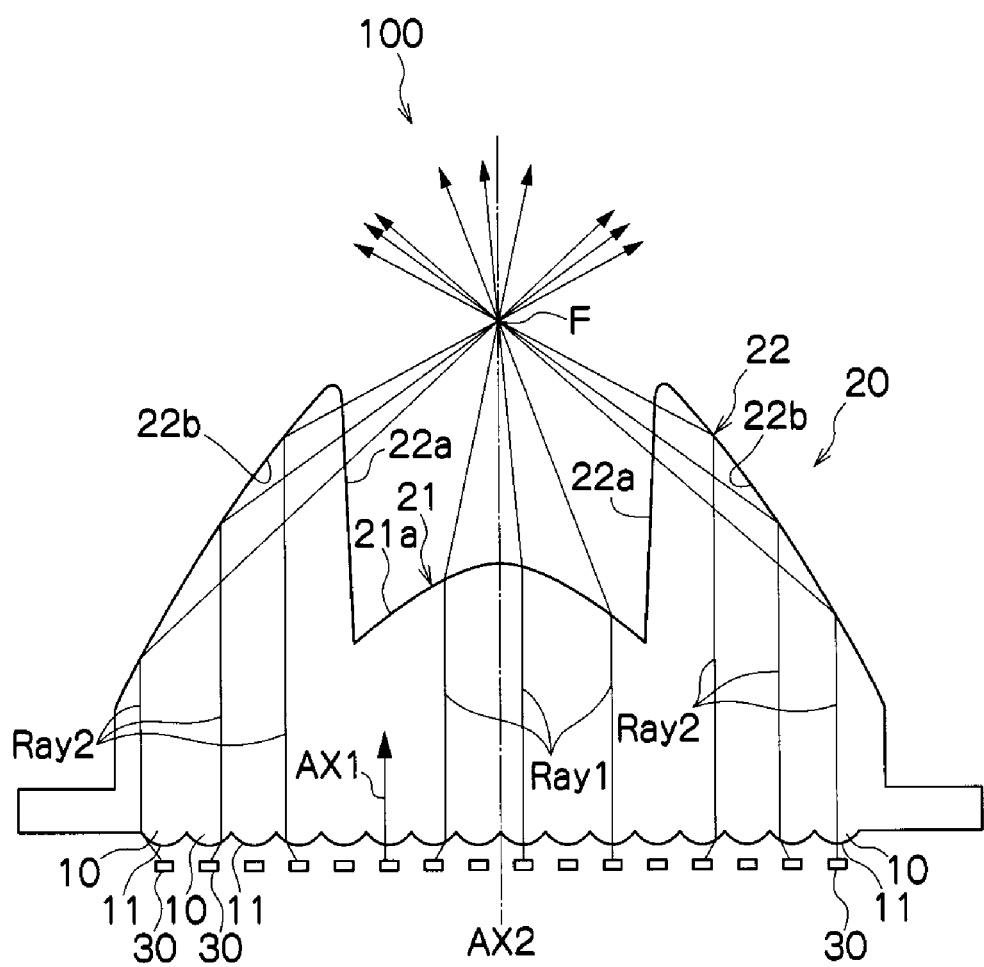
FIG. 2 is a schematic cross sectional view of a lens made in accordance with principles of the presently disclosed subject matter and a plurality of LED light sources in combination to form a lighting fixture made in accordance with principles of the presently disclosed subject matter.

FIG. 2 illustrates a lens 100 according to the present exemplary embodiment. The lens 100 can be a solid lens body formed by injection molding a transparent resin (such as acrylic resins, polycarbonate resins, and the like) or a glass material. The lighting fixture of the present exemplary embodiment can be composed of the lens 100 and a plurality of LED light sources 30. Each of the LED light sources 30 can be an LED light source formed by packaging one or a plurality of LED chips. In FIG. 2, the plurality of LED light sources 30 can be distributed and arranged on a certain plane at a predetermined region so that the respective optical axes AX1 are directed in the same direction (in FIG. 2, the direction is an upward direction as one example).

The lens 100 can include a plurality of light incident portions 10 and a light exiting portion 20. Each of the light incident portions 10 may be disposed to face each of the plurality of LED light sources 30 (each light emission surface). The light incident portions 10 can each have a light incident surface 11. The light incident surface 11 can receive light beams emitted from the corresponding LED light source 30 and collimate the same with respect to the optical axis AX1 (namely the main optical axis AX2) of the LED light source 30. In the exemplary embodiment of FIG. 2, the light incident surface 11 can be configured by a convex lens that is convex toward the LED light source.

The light exiting portion 20 can be disposed along the optical paths of the collimated light beams entering the inside of the lens through the respective light incident portions 10. The light exiting portion 20 can include a center lens portion 21 and a surrounding lens portion 22 disposed to surround the center lens portion 21. The surrounding lens portion 22 can be located adjacent to the center lens portion 21.

The center lens portion 21 can include a center light exiting surface 21a. The center light exiting surface 21a can be disposed on the optical paths of the collimated light beams designated as "Ray1" in FIG. 2 which are emitted from the LED light sources 30 that are disposed on a center area among the plurality of LED light sources 30 distributedly disposed in the predetermined region. The center light exiting surface 21a can be a lens surface that can converge the collimated light beams Ray1 that reach the center light exiting surface 21a at the single focus F. In the exemplary embodiment of FIG. 2, the center light exiting surface 21a can be formed of a convex lens surface formed using the optical axis AX2 as a rotation axis and being convex toward the illumination direction.

The surrounding lens portion 22 can include a cylindrical surrounding light exiting surface 22a disposed to surround the center light exiting surface 21a and a reflecting surface 22b. The reflecting surface 22b can be disposed on optical paths of the collimated light beams designated as "Ray2" in FIG. 2 which are emitted from the LED light sources 30 that are disposed on a surrounding area around the center area among the plurality of LED light sources 30 distributedly disposed in the predetermined region. The reflecting surface 22b can totally reflect the collimated light beams Ray2 so as to cause the reflected light beams to exit through the surrounding light exiting surface 22a and be converged at the single focus F. In the exemplary embodiment of FIG. 2, the reflecting surface 22b may be formed of a revolved parabolic surface formed using the optical axis AX2 as a rotation axis.

Figure 5:
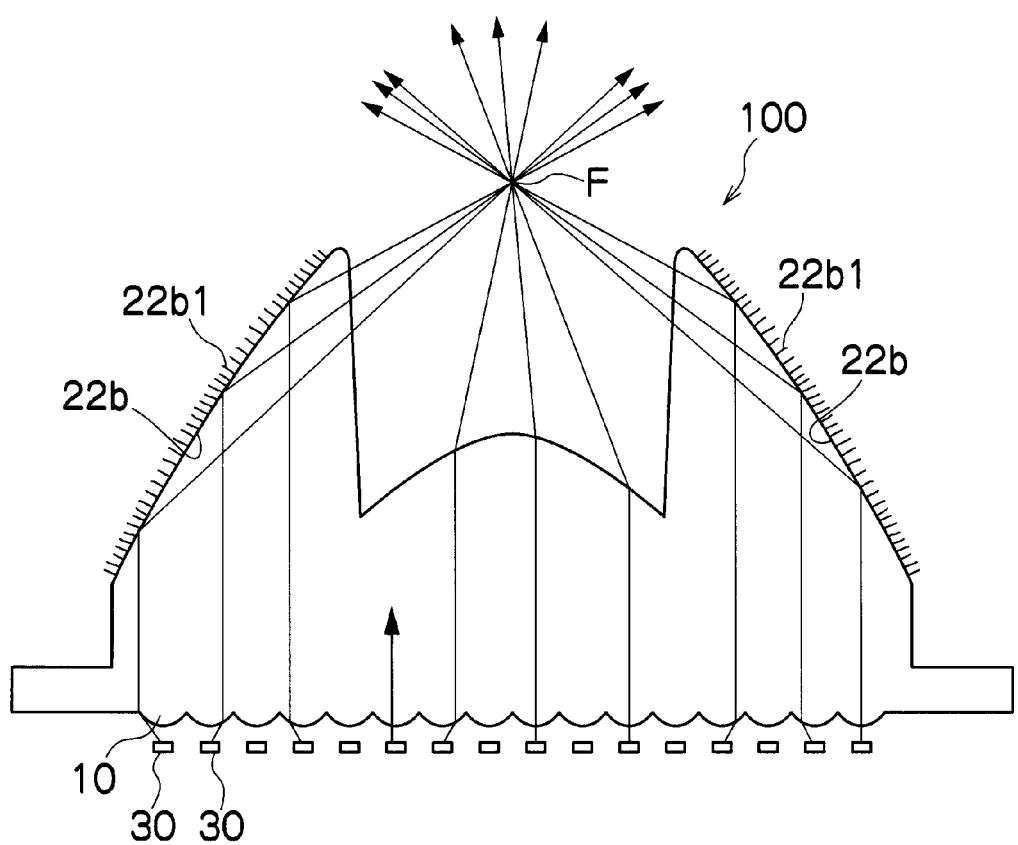
FIG. 5 is a schematic cross sectional view of a modified example of the lens of the above exemplary embodiment and a plurality of LED light sources used in combination to form a lighting fixture made in accordance with principles of the presently disclosed subject matter.

Further, as shown in FIG. 5, the surface of the lens 100 corresponding to the reflecting surface 22b may be subjected to a mirror treatment such as an aluminum deposition 22b1 or the like. Alternatively, on the surface of the lens 100 corresponding to the reflecting surface 22b a reflective member 23 (shown in FIG. 6) having a mirror finish such as an aluminum deposition can be disposed. By these configurations, the collimated light beams Ray2 reaching the reflecting surface 22b can be prevented from exiting through the reflecting surface 22b, thereby improving the light utilizing efficiency.

Figure 6:
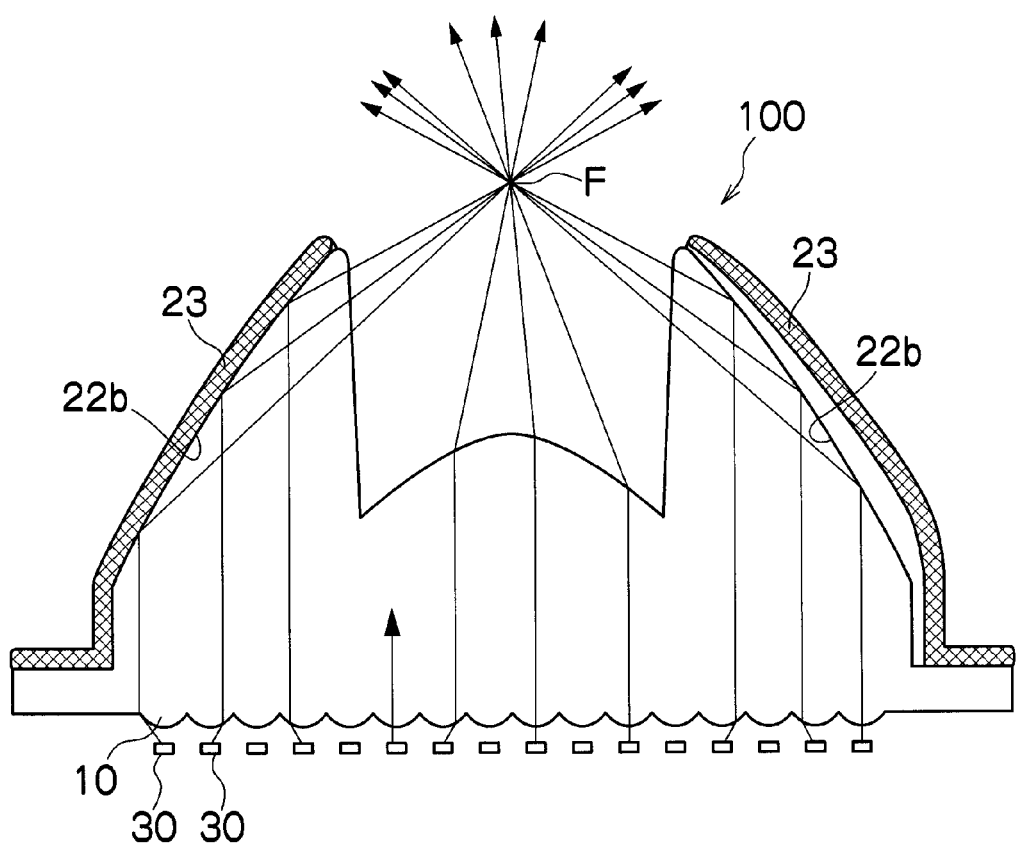
FIG. 6 is a schematic cross sectional view of the modified example of the lens of FIG. 5 and a plurality of LED light sources used in combination to form a lighting fixture made in accordance with principles of the presently disclosed subject matter.

Note that in FIGS. 5 and 6 the aluminum deposition 22b1 and the reflecting member 23 are respectively illustrated with a thicker dimension for emphasis than the actual dimensions, and a person skilled in the art can easily recognize that the actual thickness of these layers is very thin when compared with the lens dimension.

In the lens 100 configured as described above, the light beams emitted from the plurality of LED light sources 30 can enter the inside of the lens 100 while being collimated by the plurality of light incident portions 10 which are disposed to face the corresponding LED light sources 30, so that the collimated light beams Ray1 and Ray2 are parallel with the optical axis AX1 of the LED light sources 30. Then, among the entering light beams, the collimated light beams Ray1 directed to the center lens portion 21 can exit through the center light exiting surface 21a to be converged on the single focus F. On the other hand, the collimated light beams Ray2 directed to the surrounding lens portion 22 can be totally reflected by the surrounding reflecting surface 22b to exit through the surrounding light exiting surface 22a and be converged on the single focus F.

Figure 1:
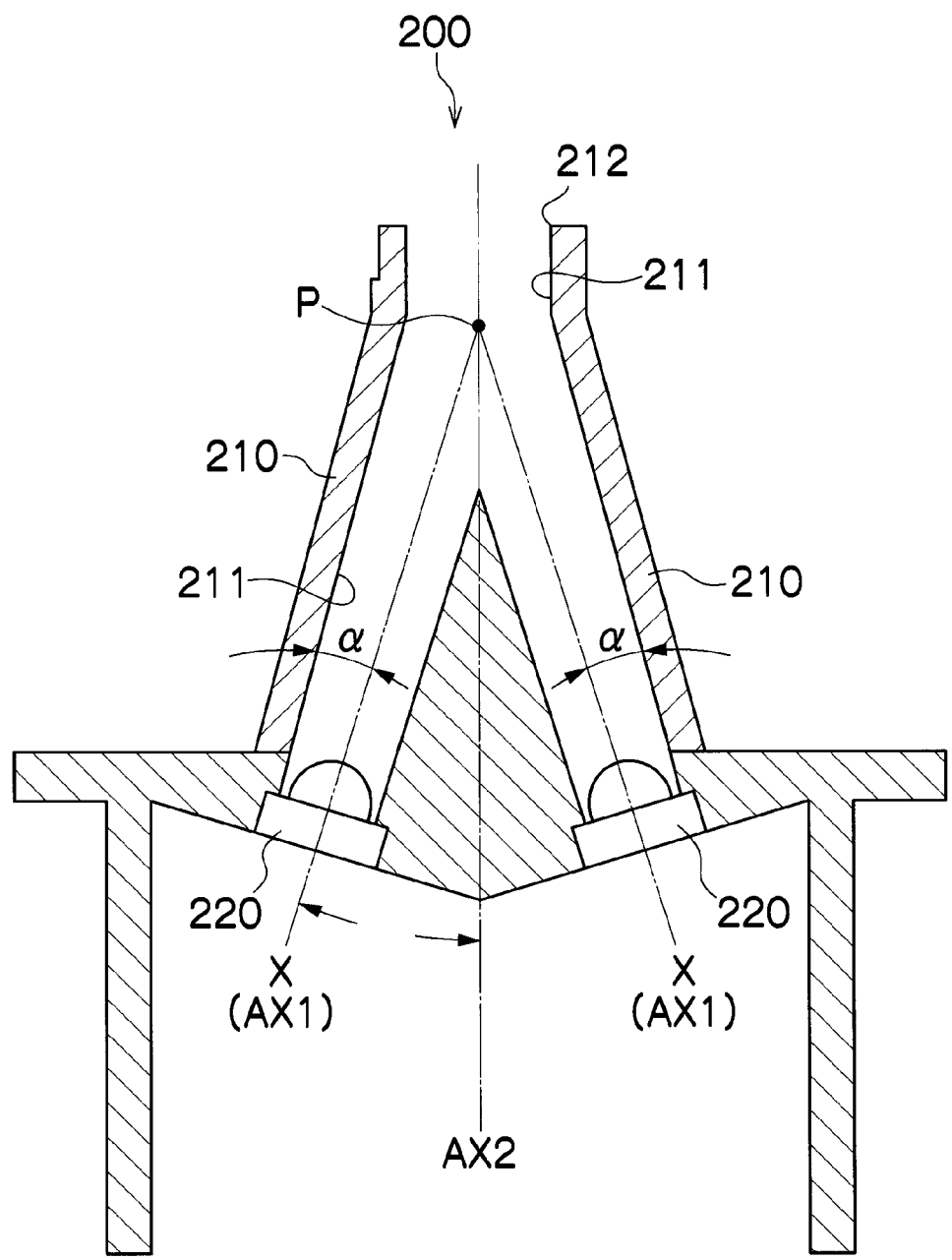
FIG. 1 is a cross sectional view of a conventional light source apparatus for a vehicle headlamp.

Since the lens 100 configured as described above does not utilize a converging hood 210 of the type shown in FIG. 1 with reference to the conventional art, even if the number of light sources 30 increases, the configuration is not so complicated. Accordingly, by utilizing such a lens 100 a user can utilize a plurality of light sources 30 as a single light source with a simpler configuration than a conventional light source apparatus utilizing a plurality of light-converging hoods 210. Namely, the lens 100 can gather the light beams (output) emitted from the plurality of light sources 30, so that a lighting fixture utilizing the lens 100 can serve as a brighter light source with the many LED light sources employed.

Figure 3:
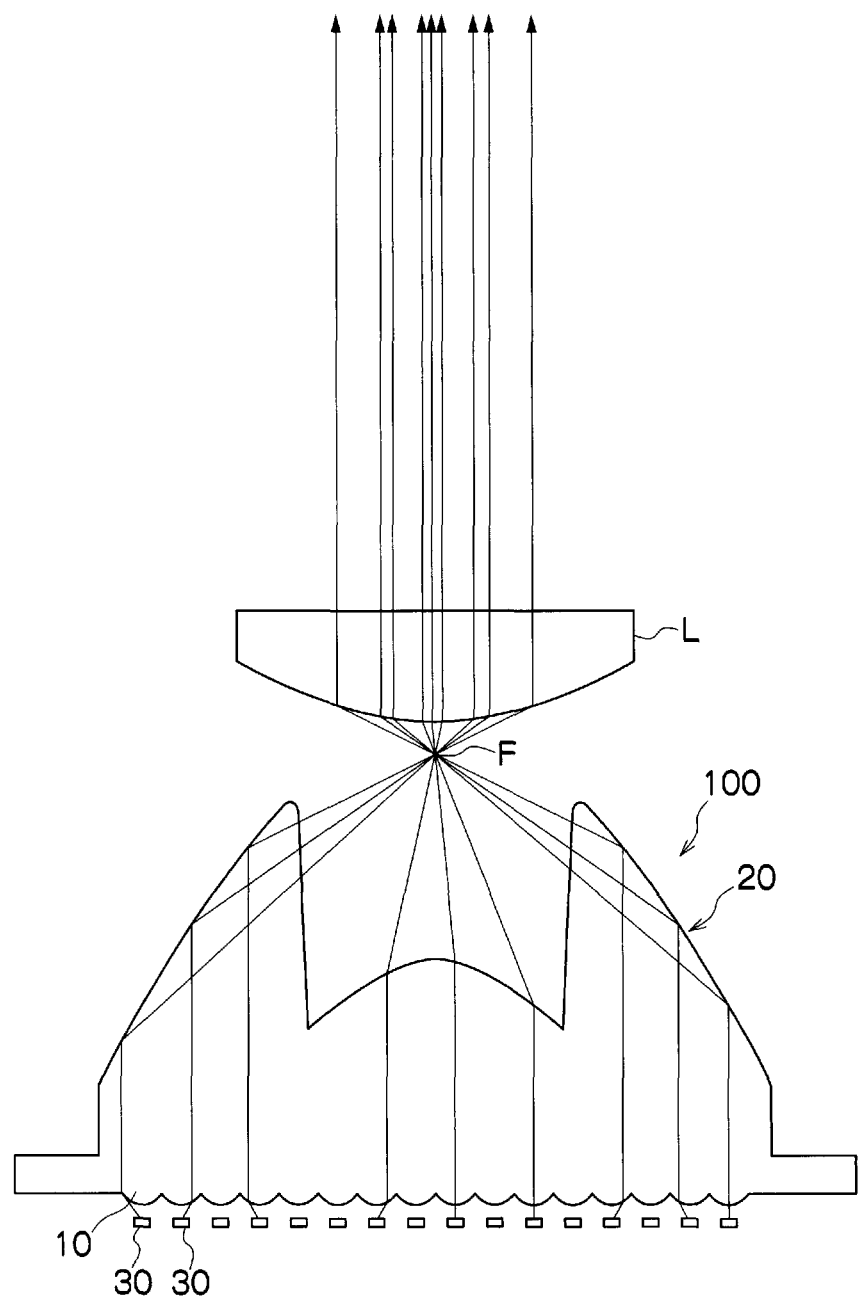
FIG. 3 is a schematic cross sectional view of the lens of FIG. 2 and another lens used in combination to form another lighting fixture made in accordance with principles of the presently disclosed subject matter.
Figure 4:
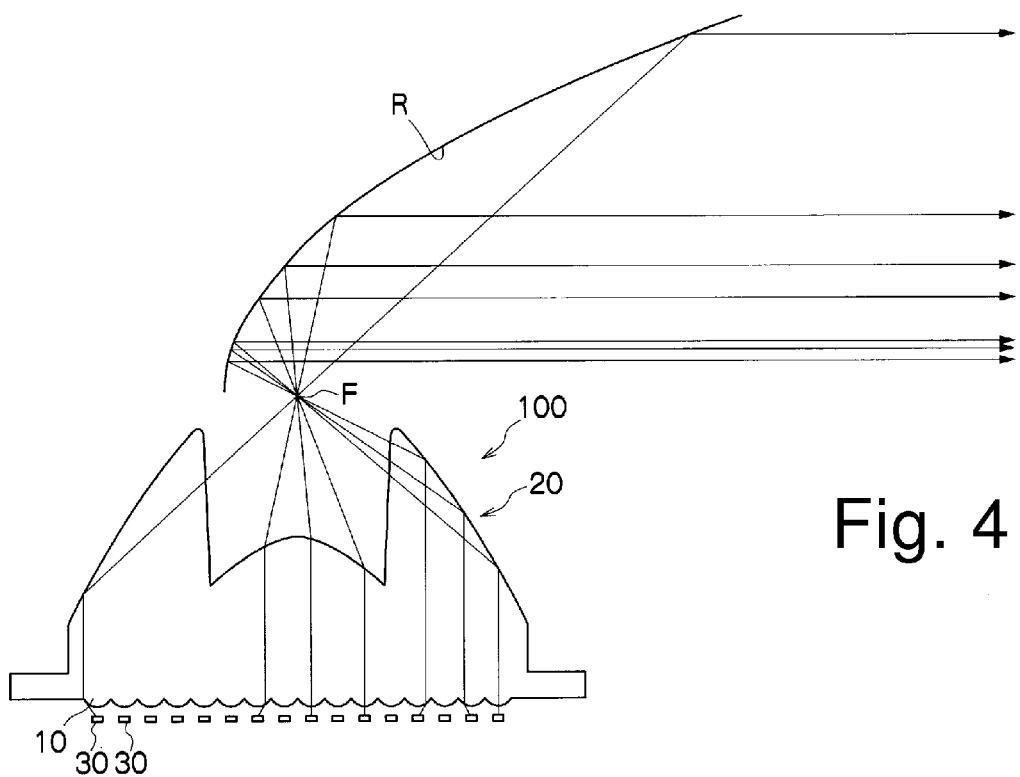
FIG. 4 is a schematic cross sectional view of the lens of FIG. 2 and a reflector R used in combination to form another lighting fixture made in accordance with principles of the presently disclosed subject matter.

FIG. 3 shows another lighting fixture utilizing the lens of the present exemplary embodiment. The lighting fixture of FIG. 3 can include the lens 100 of FIG. 2 and another lens L so as to effectively control the light distribution formed by the light beams from the plurality of LED light sources 30. The shown lens L can have a focus at or near the focus F of the lens 100 so that the converged light beams can be collimated for projection. In this configuration, all the light beams emitted from the LED light sources 30 arranged in a wide area can be utilized as a single light source for projecting collimated light beams. This can be applied to a lighting fixture with a high intensity. Still another lighting fixture is illustrated in FIG. 4 wherein the lens of the present exemplary embodiment is utilized. In the lighting fixture of FIG. 4, the light beams at the single focus F from the lens 100 can be considered as a light source. When a reflector R having a focus at or near the focus F of the lens 100 is combined with the lens 100, the plurality of LED light sources 30 arranged in a wide area can be handled as a single light source for light distribution control.

Since the lens 100 can have the surrounding lens portion 22, when compared with the case where a lens has a center lens portion 21 only for forming the single focus F, the light amount and the illumination area for the reflector R can be improved. In other words, the combination of the surrounding lens portion 22 with the center lens portion 21 can result in improved light output and coverage for the reflector R.

In the conventional LED light source apparatus 200 as shown in FIG. 1, a plurality of light-converging hoods 210 can be utilized to form a pseudo light source P. In this case, the light-converging hood 210 must be subjected to a surface treatment such as aluminum deposition or the like to form a uniform reflecting surface 211 so that the light can project in the optical axis AX2 direction to serve as a pseudo light source P derived from the plurality of LED light sources 220. However, depending on the surface treatment, reflecting losses may occur, thereby degrading the light utilization efficiency. Furthermore, since the hood has a narrow opening and a deep inside, it is difficult to form a uniform reflecting surface using surface treatments such as aluminum deposition or the like, thereby increasing the manufacturing cost in terms of yield or the like.

However, the lens 100 and the lighting fixture utilizing the lens 100 of the present exemplary embodiment can project light by the action of the center light exiting surface 21a and the surrounding light exiting surface 21b in the optical axis AX2 direction without the need for any surface treatment like in the conventional light source apparatus 200, but with only the specific lens design. Accordingly, the light beams from the plurality of light sources 30 can be utilized as a single light source just like an incandescent bulb or the like (light source that can emit light omnidirectionally).

Next, modified examples of the presently disclosed subject matter will be described.

Figure 7:
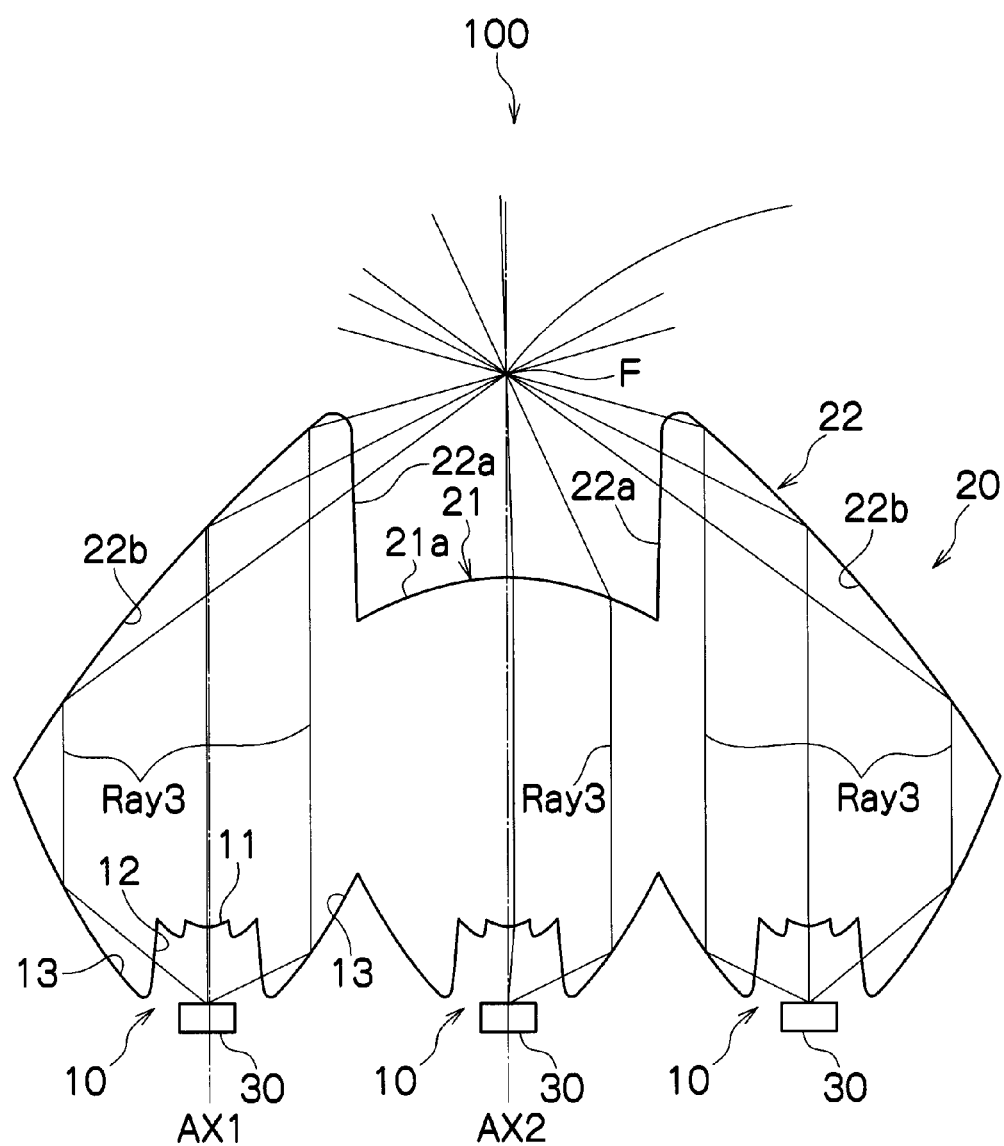
FIG. 7 is a schematic cross sectional view of another lens made in accordance with principles of the presently disclosed subject matter and a plurality of LED light sources in combination to form another lighting fixture made in accordance with principles of the presently disclosed subject matter

In the above exemplary embodiment, the light incident portions 10 have been configured to include a convex lens 11 that is convex toward the LED light source, but the presently disclosed subject matter is not limited to this. For example, the light incident portions 10 each can include, as shown in FIG. 7, a center light incident surface 11 arranged on the respective optical axes AX1 of the LED light sources 30, a cylindrical surrounding light incident surface 12 disposed to surround the center light incident surface 11, and a reflecting surface 13 disposed on the optical paths of the incident light beams depicted as "Ray3" in FIG. 7, entering through the surrounding light incident surface 12. In this case, the incident light beams Ray3 entering through the surrounding incident surface 12 can be reflected by the reflecting surface 12 so as to be collimated in parallel with the lens optical axis AX1, and directed to the reflecting surface 22b or the center light exiting surface 21a of the light exiting portion. The reflecting surface 13 may be formed of a revolved parabolic surface. The light exiting portion of this lens can have the same configuration as that of FIG. 2, and a description thereof will be omitted here.

This configuration can further improve the light gathering performance at the light incident side, thereby improving the light utilization efficiency. Accordingly, the number of light sources can be reduced by the improved degree, thereby decreasing its cost. Further, depending on the decreased number of light sources, the entire size can be reduced, thereby obtaining more compact lighting fixtures.

This modified example of the lens 100 can allow a user to utilize a plurality of light sources 30 as a single light source with a simpler configuration than a conventional light source apparatus utilizing a plurality of light-converging hoods 210. Namely, the modified example of the lens 100 can gather the light beams (output) emitted from the plurality of light sources 30, so that the lighting fixture utilizing the lens 100 can serve as a brighter light source with the many LED light sources employed.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lens, capable of being used with a plurality of light sources in combination, and having a single focus, the lens comprising:
    a plurality of light incident portions each disposed so as to face each of the plurality of light sources, the plurality of light incident portions configured to collimate light beams emitted from the plurality of light sources in parallel with a predetermined optical axis while guiding the light beams inside the lens; and
    a light exiting portion including a refracting surface disposed on optical paths of the collimated light beams guided from the plurality of the light incident portions into the inside of the lens, the light exiting portion configured to cause the collimated light beams to exit and converge on the single focus, wherein:
    the light exiting portion includes a center lens portion and a surrounding lens portion configured to surround the center lens portion;
    the center lens portion includes a center light exiting surface disposed on at least part of the optical paths of the collimated light beams so that the collimated light beams exit through the center light exiting surface and converge on the single focus;
    the surrounding lens portion includes a surrounding light exiting surface configured to surround the center light exiting surface and a reflecting surface disposed on at least a part of the optical paths of the collimated light beams; and
    the reflecting surface configured to reflect the collimated light beams so as to cause the reflected light beams to exit through the surrounding light exiting surface and converge on the single focus.

2. The lens according to claim 1, wherein the light incident portions are each formed of a convex lens surface being convex toward a light source side and configured to collimate the incident light beams with respect to the optical axis.

3. The lens according to claim 1, wherein the light incident portions each include a center light incident surface arranged on respective optical axes, a cylindrical surrounding light incident surface disposed to surround the center light incident surface, and a reflecting surface disposed on the optical paths of the incident light beams from the surrounding light incident surface.

4. The lens according to claim 3, wherein:
    the center light incident surface of the light incident portion is formed of a convex lens surface being convex toward a light source side and configured to collimate the incident light beams with respect to the optical axis; and
    the reflecting surface is formed of a revolved parabolic surface to collimate the light beams entering through the surrounding light incident surface.

5. The lens according to claim 1, wherein the center light exiting surface is formed of a convex lens surface being convex toward an illumination direction and having a focus coinciding with the single focus with the optical axis as a rotation axis; and
    the reflecting surface of the surrounding lens portion is formed of a revolved parabolic surface with the optical axis as a rotation axis and having a focus coinciding with the single focus.

6. The lens according to claim 2, wherein the center light exiting surface is formed of a convex lens surface being convex toward an illumination direction and having a focus coinciding with the single focus with the optical axis as a rotation axis; and
    the reflecting surface of the surrounding lens portion is formed of a revolved parabolic surface with the optical axis as a rotation axis and having a focus coinciding with the single focus.

7. The lens according to claim 3, wherein the center light exiting surface is formed of a convex lens surface being convex toward an illumination direction and having a focus coinciding with the single focus with the optical axis as a rotation axis; and the reflecting surface of the surrounding lens portion is formed of a revolved parabolic surface with lens optical axis as a rotation axis and having a focus coinciding with the single focus.

8. The lighting fixture according to claim 4, wherein the plurality of light sources include LED light sources.

9. The lighting fixture according to claim 4, further comprising a second lens disposed in front of the lens, the second lens having a focus at or near the single focus of the lens.

10. The lighting fixture according to claim 4, further comprising a reflector disposed in front of the lens and having a focus at or near the single focus of the lens.

11. A lighting fixture, comprising:
a plurality of light sources; and
a lens having a single focus and including: a plurality of light incident portions each disposed so as to face each of the plurality of light sources, the plurality of light incident portions configured to collimate light beams emitted from the plurality of light sources in parallel with a predetermined optical axis while guiding the light beams inside the lens; and a light exiting portion including a refracting surface disposed on optical paths of the collimated light beams guided from the plurality of the light incident portions into the inside of the lens, the light exiting portion configured to cause the collimated light beams to exit and converge on the single focus of the lens, wherein
the light exiting portion comprises a center lens portion and a surrounding lens portion configured to surround the center lens portion;
the center lens portion includes a center light exiting surface disposed on at least part of the optical paths of the collimated light beams so that the collimated light beams exit through the center light exiting surface and converge on the single focus;
the surrounding lens portion includes a surrounding light exiting surface configured to surround the center light exiting surface and a reflecting surface disposed on at least a part of the optical paths of the collimated light beams; and
the reflecting surface configured to reflect the collimated light beams so as to cause reflected light beams to exit through the surrounding light exiting surface and converge on the single focus.

12. The lighting fixture according to claim 11, wherein the light incident portions are each formed of a convex lens surface being convex toward a light source side and configured to collimate incident light beams with respect to the optical axis.

13. The lighting fixture according to claim 11, wherein the light incident portions each include a center light incident surface arranged on respective optical axes, a cylindrical surrounding light incident surface disposed to surround the center light incident surface, and a reflecting surface disposed on the optical paths of the incident light beams from the surrounding light incident surface.

14. The lighting fixture according to claim 13, wherein:
the center light incident surface of each of the light incident portions is formed of a convex lens surface being convex toward a light source side and configured to collimate the incident light beams with respect to the optical axis; and
the reflecting surface is formed of a revolved parabolic surface to collimate light beams entering through the surrounding light incident surface.

15. The lighting fixture according to claim 11, wherein:
the center light exiting surface is formed of a convex lens surface being convex toward an illumination direction and having a focus coinciding with the single focus with the optical axis as a rotation axis; and
the reflecting surface of the surrounding lens portion is formed of a revolved parabolic surface with the optical axis as a rotation axis and having a focus coinciding with the single focus.

* * * * *